United States Patent [19]

Dean et al.

[11] 4,010,041

[45] Mar. 1, 1977

[54] ANHYDRIDE DERIVATIVES

[75] Inventors: Malcolm Leslie Dean, Bayswater; Bruce Leary, Frankston, both of Australia

[73] Assignee: Dulux Australia Ltd., Melbourne, Australia

[22] Filed: Nov. 29, 1974

[21] Appl. No.: 528,548

[30] Foreign Application Priority Data

Dec. 11, 1973 Australia .................. 5950/73

[52] U.S. Cl. ............................................ 106/287 R
[51] Int. Cl.$^2$ ............................................ C09K 3/00
[58] Field of Search ............... 106/287; 260/475 P, 260/75, 850

[56] References Cited

UNITED STATES PATENTS

| | | | |
|---|---|---|---|
| 2,585,323 | 2/1952 | Elwell | 260/475 |
| 2,821,542 | 1/1958 | Schmutzler | 260/75 R |
| 3,035,026 | 5/1962 | Stephens | 260/75 R |

*Primary Examiner*—Theodore Morris
*Attorney, Agent, or Firm*—Cushman, Darby & Cushman

[57] ABSTRACT

A novel derivative which is an ester of trimellitic anhydride or pyromellitic dianhydride, the derivative containing carboxyl and hydroxyl groups and comprising two mono-esters per derivative molecule of diols selected from alkylene glycols and dihydroxy esters of such glycols with dicarboxylic acids. These derivatives have a minimum acid value of 40 mgm KOH per gm and when blended with a suitable cross-linking agent are useful as film-forming constituents of high-solids coating compositions.

3 Claims, No Drawings

ANHYDRIDE DERIVATIVES

This invention related to novel derivatives of polybasic acid anhydrides and paints comprising such derivatives.

The novel derivatives of this invention are esters of trimellitic anhydride or pyromellitic dianhydride which contain both carboxyl groups and hydroxyl groups, the hydroxyl groups being spaced at a particular distance apart in the molecule.

We now disclose a novel derivative of a polybasic acid anhydride selected from trimellitic anhydride and pyromellitic dianhydride the derivative containing both hydroxyl and carboxyl groups and comprising two monoesters per derivative molecule of diols selected from alkylene glycols and di-hydroxy esters of alkylene glycols with dicarboxylic acids, the derivative being further characterised in that it has an acid value of 40 mgm KOH per gm minimum and comprises two hydroxyl groups, which are the sole hydroxyl groups in the molecule, depending from separate carbon atoms which constitute part of a chain of not more than 40 convalently linked carbon and oxygen atoms the said separate carbon atoms being located at opposite ends of and not more than three atoms from the extremities of the chain.

It will be seen from the above description that these compounds, although not necessarily prepared in that manner, have the structure of esters of either trimellitic or pyromellitic dianhydride in which, by an anhydride ring-opening reaction and/or the esterification of a carboxyl group, each of two mols of a diol has been linked by an ester group, utilising one of its hydroxyl groups, to the anhydride molecule. Thus, the derivative as a whole will contain two unreacted hydroxyl groups and it is a characteristic of these novel materials which we disclose herein and which have certain useful characteristics in common, that the hydroxyl groups must be near to or at the extremities of a chain of covalently linked carbon and oxygen atoms which comprises the backbone of the molecule. There are also present free carboxyl groups, the concentration of which in the molecule depends on the size of the derivative molecule as a whole and is thus conveniently and conventionally expressed as the acid value of the compound in units of mgm KOH equivalent to 1 gm of the derivative. In the case of a derivative of trimellitic anhydride the free carboxyl groups may be at least in part those groups present in the original molecules or, especially in the case of pyromellitic dianhydride derivatives they will be formed by the opening of anhydride rings with the simultaneous formation of ester links and free carboxyl groups.

The diols, which in the form of their mono-esters, comprise portion of the derivative molecule, may be simple aliphatic diols, for example ethylene glycol, propylene glycol, butane 1,4-diol and hexane 1,6-diol.

The mono-esters need not, however, have been prepared by the esterification of one hydroxyl group of a diol. For example, they may be prepared by a ring-opening technique from alkylene oxides, for example ethylene oxide, propylene oxide and butylene oxide.

An alternative class of diol which may be utilised in our invention is that of the di-hydroxy esters of alkylene glycols and dicarboxylic acids. It is well-known that these esters are essentially linear chain-like molecules and commonly have their hydroxyl groups located at or near opposite extremities of the molecular chain. Our comprehension of the essentially linear nature of these diol molecules admits of the use in their manufacture of glycols which show a limited degree of departure from linearity, to the extent that they may comprise short pendent side-chains, for example a pendent methyl or ethyl group. Thus suitable di-dihydroxy esters are esters of, for example, the above-mentioned simple aliphatic glycols and dicarboxylic acids, for example, succinic acid, glutaric acid, adipic acid, azaleic acid, ortho-phthalic acid, iso-phthalic acid and tere-phthalic acid. It will be understood by those skilled in the art that where the above materials exist in the anhydride form, that is as an alkylene oxide, or an acid anhydride, they can be used as such to prepare the diols.

Thus, suitable di-hydroxy esters are, for example, bis(hydroxy ethyl) azelate, bis(hydroxypropyl) adipate and 2,2-dimethyl-3-hydroxypropyl-2,2 dimethyl3-hydroxypropionate.

The methods of preparing linear di-hydroxy esters of the above type are well-known. Thus, for example, a suitable ester can be prepared by first condensing one mol of hexane 1,6-diol with two mol of succinic anhydride and then propoxylating the carboxyl groups so-formed to provide two hydroxyl groups per molecule. Alternatively, the two mol of succinic anhydride can be replaced by one mol each of succinic and phthalic anhydride.

The novel derivatives of this invention may be prepared by reacting the appropriate polybasic acid anhydride molecule with two mol of a suitable glycol, di-hydroxy ester or mixtures thereof. Provided the derivative so-formed has the required acid value and the hydroxyl groups are spaced as hereinabove defined, in the completed derivative, we place no limitations on the selection of the glycols and di-hydroxy ester used in its preparation. Thus the hydroxyl-bearing mono-esters may be the same or different in the one derivative.

An alternative method of making a suitable derivative is, for example, to react one mol of trimellitic anhydride with one mol of a suitable diol in a ring-opening reaction and then to react the carboxyl group so-formed with an alkylene oxide, e.g. propylene oxide, to form a second hydroxyl group in the molecule. Pyromellitic dianhydride may similarly be reacted with two mol of diol to form the required two mono-esters, again utilising a ring-opening reaction. Optionally one of the carboxyl groups so-formed may be esterfied with a monohydric alcohol to reduce it carboxyl functionality to unity.

The novel derivatives of this invention have a number of important characteristics in common. For example, they can be blended with suitable cross-linking agents to form liquid paint compositions. Provided the anhydride derivative comprises not more than one aromatic dicarboxylic acid residue per molecule, the paints so-formed have unusually low viscosities at high non-volatile contents. A typical example of such a composition may have a viscosity of below 10 poise measured at 25° C and at a non-volatile content of 80–85% by weight. That is, the liquid paints can be applied to a substrate by conventional means, for example by brushing, spraying, dipping and flow-coating at unusually high solids. Bearing in mind that conventional paints typically contain of the order of 60% or more by weight of volatile constituents, which must be disposed of during the paint curing cycle in order to reduce them to tractable viscosities, the advantage of our novel compositions in reducing atmospheric pollution is self-evident.

Furthermore, despite their surprisingly low molecular weight relative to that of conventional paint film-forming materials, the derivatives of this invention cure, through reaction of their hydroxyl groups with a suitable cross-linking agent, to form hard, tough film. The curing takes place at normal paint stoving temperatures, e.g. 150° C. It is a particular valuable feature of our compositions that they are self-catalysing when stoved with a suitable cross-linking agent, there being no need to add catalysts or accelerators to them. The stoved films appear to exhibit unusually good adhesion to metallic substrates.

A derivative as described hereinabove may be used as the sole hydroxyl-containing component in a coating composition or alternatively it may be blended with aliphatic glycols or conventional low molecular weight diols, e.g. a carboxyl-free ester diol of adipic acid, phthalic anhydride and propylene oxide in the molar proportion of 1:1:3 and with a molecular weight of about 450. Other suitable low molecular weight ester diols which may be blended with the derivative of this invention are those described in, for example, our co-pending Australian patent applicaton No. P.A. 9068. We have, in fact, found that blends with simple ester diols can, at times, increase the adhesion of coatings to a greater degree than might be suspected from the performance of the coatings from which they are omitted.

We have also found that the derivatives of this invention may be blended to a limited extent with a minor proportion of a tri-hydroxy ester of trimellitic anhydride or pyromellitic anhydride although due regard must be paid in so-doing to the effect this has on the viscosity characteristics of the paint. The general effect of such an addition is to markedly reduce the solids of the paint at practical application viscosities, but it provides film-forming compositions which are of acceptable quality in other respects.

Our preferred liquid coating compositions utilise, as the cross-linking agent, methylol melamine containing 4-6 methylol groups per molecule which groups are substantially fully etherified with methanol or ethanol.

The methods of preparing ethers of methylol melamine are well-known and involve the reaction of melamine with formaldehyde and etherification of the resultant methylol groups with the appropriate alcohol. A single alcohol may be used as the etherifying agent or a mixture of methanol and ethanol may be used to give mixed ethers.

The coating compositions we now disclose consist essentially of a blend of anhydride derivatives as hereinabove defined and cross-linking agent. The liquid compositions may be pigmented by dispersing therein suitable pigments in known manner.

When we require that the film-forming constituents of our coating compositions shall consist essentially of a blend of the anhydride derivative of this invention and cross-linking agent we have in mind the practice of utilising small amounts of certain auxiliary materials for special purposes in paint compositions and, as mentioned hereinabove, the advisability of using limited amounts of certain glycols and ester diols in the formulation. Some of these materials, for example pigment dispersing agents and rheology modifiers, may themselves be polymeric and hence contribute to the total film-forming constituents of the compositions. We do not exclude the application of such common practices in the performance of our invention, but bearing in mind that these auxiliary materials are normally used at very low concentrations, for example 0.5–5.0% maximum by weight of the total composition, their contribution to the film-forming constituents is minimal and is comprehended by our above-defined composition. It is also to be understood that the components from which our compositions are prepared can, and usually will be, commercial products. In accordance with established practice such products may well contain a small amount, of the order of a few percent by weight, of impurities which, if suitably reactive, could become incorporated as a minor chance component of the cured paint film.

The coating compositions are prepared by blending together the anhydride derivative, cross-linking agent and other auxiliary materials in suitable proportions, optionally in the presence of a minor proportion of a volatile organic liquid compatible therewith. In general, we select the proportions of components in the molar ratio anhydride derivative/cross-linking agent of the order of 1:3 or alternatively in a weight proportion corresponding to the stoichometric balance between hydroxyl groups of the anhydride derivative and available ether groups of the cross-linking agent.

As mentioned above, the preferred film-forming constituents of this invention are of unusually low molecular weight compared with constituents used hitherto for this purpose and hence they are usually correspondingly more volatile.

Our method of determining non-volatile contents has been chosen to take account of this and also of the inaccuracies which can occur unless potentially chemically reactive mixtures are tested under carefully selected and standardised conditions. We have, therefore, standardised on the testing procedures of the American Society for Testing and Materials method D1644-59. Method A, but limiting the heating time to 1 hour at 105° C, in determining our non-volatile contents.

The coatings require stoving, for example at a temperature of the order of 150° C and for 30–60 minutes. Alternatively, since these coatings are very suitable for use as coil coatings, coil coating bakes with peak metal temperatures of 200°–250° C for one second can also be used satisfactorily. It is a useful characteristic of our compositions that they appear to resist quite significantly extended over-baking cycles without a serious deterioration in their properties.

The invention is illustrated by the following examples in which all parts are given by weight.

EXAMPLE 1

Preparation of a derivative of trimellitic anhydride according to the invention, comprising two monoesters of a linear dihydroxy ester which has the form of the double ester of adipic acid and 1,2propylene diol.

146 parts of adipic acid were charged to a reaction vessel fitted with a stirrer, heating mantle, thermometer and an efficient condenser and heated to 150°–160° C.

A mixture of 116 parts of propylene oxide with 0.6 parts of a tertiary amine catalyst* was slowly added to the batch to maintain steady reflux at a temperature between 150° and 160° C until the acid value fell to below 1 mg KOH/g.

*A proprietary product: "Armeen" DMCD, was used. "Armeen" is a registered trade mark.

The reaction mixture was then cooled to 120° C and 192 parts of trimellitic anhydride added. The temperature was raised to 175° C and held for ½ hour. The infra-red spectrum indicated complete reaction of anhydride groups.

A mixture of 58 parts of propylene oxide with 0.3 parts of "Armeen" DMCD was slowly added at a temperature between 150° and 160° C. The acid value was then 100 mg KOH/g.

90 Parts of methyl ethyl ketone was added during cooling. The product was a clear viscous liquid.

EXAMPLE 2

Preparation of a derivative of pyromellitic dianhydride according to the invention, comprising two monoesters of a linear dihydroxy ester which has the form of the double ester of adipic acid and 1,2 propylene diol.

218 Parts of pyromellitic dianhydride and 524 parts of bis-hydroxypropyladipate were charged into a reaction vessel fitted with a stirrer, condenser and thermometer, and heated at 170° C until a clear liquid was formed.

The infra-read spectrum indicated complete reaction of anhydride groups. The product had an acid value of 308 mgm KOH per gm and was thinned by the addition of 400 parts of methyl ethyl ketone during cooling.

EXAMPLE 3

Preparation of a derivative of trimellitic anhydride according to the invention, comprising a monoester of 1,2 propylene diol and a monoester of a linear dihydroxyester which has the form of a diester of 1,6 hexane diol with succinic acid which has been further esterified to form a double ester consisting of two half esters of 1,2 propylene diol.

50 Parts of 1,6 hexane diol and 85 parts of succinic anhydride were charged to a reaction vessel fitted with a stirrer, heating mantle, thermometer and an efficient condenser, and heated to 170° C for ½ hr. The infra-red spectrum indicated that no anhydride was left.

A mixture of 49.2 parts of propylene oxide with 0.5 parts of "Armeen" DMCD was slowly added to the batch to maintain steady reflux at a temperature between 150° and 160° C until the acid value fell to below 1 mg KOH/g. The reaction mixture was then cooled to 110° C, and 81.5 parts of trimellitic anhydride added. The temperature was raised to 175° C and held for ½ hour. The infra-red spectrum showed no anhydride was present.

A mixture of 25 parts of propylene oxide with 0.25 parts of "Armeen" DMCD was slowly added to maintain steady reflux at a temperature between 150° and 160° C until the acid value fell to 82 mg KOH/g.

51 Parts of ethylene glycol monobutyl ether was added during cooling. The product was a clear viscous liquid.

EXAMPLE 4

Preparation of a derivative of trimellitic anhydride according to the invention, comprising a monoester of 1,2 propylene diol and a monoester of a linear dihydroxy ester which has the form of a mixed diester of 1,6 hexane diol with succinic acid and orthophthalic acid which has been further esterified to form a double ester consisting of two half esters of 1,2 propylene diol.

50 Parts of 1,6 hexane diol, 42.5 parts of succinic anhydride, and 62.7 parts of phthalic anhydride were charged to a reaction vessel fitted with a stirrer, heating mantle, thermometer and an efficient condenser, and heated to 170° C for ½ hr. The spectrum indicated complete reaction of anhydride groups.

A mixture of 49.2 parts of propylene oxide with 0.5 parts of "Armeen" DMCD was slowly added to the batch to maintain steady reflux at a temperature between 150° and 160° C until the acid value fell to below 1 mg KOH/g. The reaction mixture was then cooled to 110° C, and 81.5 parts of trimellitic anhydride added. The temperature was raised to 175° C and held for ½ hour. The infra-red spectrum showed no anhydride was present.

A mixture of 25 parts of propylene oxide with 0.25 parts of "Armeen" DMCD was slowly added to maintain steady reflux at a temperature between 150° and 160° C until the acid value fell to 77 mg KOH/g.

55 Parts of ethylene glycol monobutyl ether was added during cooling. The product was a clear viscous liquid.

EXAMPLE 5

Preparation of a derivative of phthalic anhydride, similar to the derivative of trimellitic anhydride of Example 1, but outside the scope of the invention, comprising a monoester of 1,2 propylene diol and a monoester of a linear dihydroxy ester which has the form of the double ester of adipic acid and 1,2 propylene diol. This product is used as a control in Example 6.

877 Parts of adipic acid was charged to a reaction vessel fitted with a stirrer, heating mantle, thermometer and an efficient condenser and heated to 150°–160° C.

A mixture of 721 parts of propylene oxide with 3.6 parts of "Armeen" DMCD was slowly added to the batch to maintain steady reflux at a temperature between 150° and 160° C until the acid value fell to below 1 mg KOH/g.

The reaction mixture was then cooled to 120° C and 890 parts of phthalic anhydride added. The temperature was raised to 150° C and held for ½ hour. The infra-red spectrum indicated complete reaction of anhydride groups.

A mixture of 366 parts of propylene oxide with 1.8 parts of "Armeen" DMCD was slowly added at a temperature between 150° and 160° C until the acid value fell to below 1 mg KOH/g. The product, which was a clear viscous liquid, was then cooled and collected.

EXAMPLE 6

Preparation of clear unpigmented paint compositions incorporating polybasic acid anhydride derivatives according to the invention. A 'control' paint is included for comparison.

Clear paint compositions were made by mixing the following components.

| | |
|---|---|
| Hexa-methoxy-methyl-melamine* (96% non-volatile content) | 3.13 |
| Ester derivative of polybasic acid anhydride (non-volatile basis) | 7.0 |

*"Cymel" 301 was used
"Cymel" is a registered trade mark.

Methyl ethyl ketone—in sufficient quantity to reduce viscosity to less than 10 poise.

Paints made in accordance with the above general formula, representative of paints suitable for a coil coating line, were applied by drawdown to sheet metal panels to give a dry film thickness of 15–20 micron. The coating was then cured by placing the panels in a 260° C oven for the time required to reach the peak metal temperature (PMT) quoted in the following examples. This practice follows that used in coil coating plants, where short time, high temperature, curing is required for fast line speed.

Good ductility in post-forming operations is also a requirement of coatings used in coil lines. A T-bend test was used to assess the coating adhesion in the post-forming of coated sheet metal. The test used was as follows:

A 1 inch wide strip was cut from the coated metal sheet (0.025 inch in thickness). One inch portions of the strip were folded onto themselves with the coating outermost and pressed flat with a lever press. The paint film passed when no paint could be removed from the bend area with adhesive tape. The result is expressed as the number of thicknesses of metal enclosed inside the bend. 0 or 1 is considered excellent, 2 very good, 3 good, 4 fair, 5 poor and 6 or more very poor.

a. A clear paint was made in accordance with the above, wherein the ester derivatives of a polybasic acid anhydride was that of Example 1. It had a non-volatile content of 81% by weight at a viscosity of 8.6 poise. When cured at a PMT of 220° C, the film had a Knoop Hardness Number of 12. It showed good adhesion in the T bend test on aluminium sheet with a chromate conversion pretreatment, and fair adhesion in the same test on galvanised steel sheet with a zinc phosphate conversion pretreatment.

b. A clear paint was made in accordance with the above wherein the ester derivative of a polybasic acid anhydride was 40:60 blend of that of example 1 with that of Example 5. It had a non-volatile content of 87% by weight at a viscosity of 7.8 poise. When cured at a PMT of 250° C, the film had a Knoop Hardness Number of 9.1. It showed very good adhesion in the T bend test on aluminium sheet with a chromate conversion pretreatment, and good adhesion in the same test on galvanised steel sheet with a zinc phosphate conversion pretreatment.

c. A clear paint was made in accordance with the above, wherein the ester derivative of a polybasic acid anhydride was that of example 2. It had a non-volatile content of 81% by weight at a viscosity of 6.2 poise. On curing at a PMT of 160° C, the film had a Knoop Hardness Number of 6. It showed good adhesion in the T bend test on aluminium sheet with a chromate conversion pretreatment, and good adhesion in the same test on galvanised steel sheet with a zinc phosphate conversion pretreatment.

d. A clear paint was made in accordance with the above, wherein the ester derivative of a polybasic acid anhydride was that of Example 3. It had a non-volatile content of 84% by weight at a viscosity of 5.3 poise. On curing at a PMT of 240° C, the film had a Knoop Hardness Number of 7.4. It showed very good adhesion in the T bend test on aluminium sheet with a chromate conversion pretreatment, and good adhesion in the same test on galvanised steel sheet with a zinc phosphate conversion pretreatment.

e. A paint was made in accordance with the above, wherein the ester derivative of a polybasic acid anhydride was that of Example 4. It had a non-volatile content of 85% by weight at a viscosity of 8.9 poise. On curing at a PMT of 240° C the film had a Knoop Hardness Number of 12. It showed very good adhesion in the T bend test on aluminium sheet with a chromate conversion pretreatment, and good adhesion in the same test on galvanised steel sheet with a zinc phosphate conversion pretreatment.

f. A clear paint not according to the invention was made in accordance with the above, wherein the ester derivative of a polybasic acid anhydride was that of Example 5. It had a non-volatile content of 88% by weight at a viscosity of 7.3 poise. This paint did not cure on baking, even at a PMT of 260° C. After the addition of 1% (based on non volatile content) of para toluene sulphonic acid to the paint, the film was cured at a PMT of 240° C. The cured film had a Knoop Hardness Number of 6.2. It showed very poor adhesion in the T bend test on aluminium sheet with a chromate conversion pretreatment, and very poor adhesion in the same test on galvanised steel sheet with a zinc phosphate conversion pretreatment.

EXAMPLE 7

Preparation of pigmented paint compositions incorporating preferred polybasic acid anhydride derivatives according to the invention.

Paint compositions were made as follows:

1. A fine dispersion of rutile titanium dioxide pigment in hexamethoxymethylmelamine was obtained by sand-grinding the following mixture:

| | |
|---|---|
| Rutile titanium dioxide pigment | 500 |
| Polymeric pigment dispersant (i) | 64 |
| Hexamethoxymethylmelamine (ii) (96% by weight non volatile content) | 156 |
| Methyl ethyl ketone | 30 | i. The dispersant was a 50% by weight solution in methyl ethyl ketone of a terpolymer of methyl methacrylate, hydroxypropylacrylate and methacrylic acid.

ii. A commercial material known as "Cymel" 300 was used. ("Cymel" is a Trade Mark).

2. Paints were made by mixing the following components:

| | |
|---|---|
| Dispersion of titanium dioxide (as above) | 37.5 |
| Ester derivative of a polybasic acid anhydride (non volatile basis) | 15.9 |
| Flow agent (iii) | 2.0 |
| Methyl ethyl ketone | To a viscosity of 5 poise. | iii. A 25% by wt. solution of cellulose acetate butyrate in methyl ethyl ketone was used to promote flow.

Paints made in accordance with the above were applied by draw-down to metal sheet panels to give a dry film of 15–20 micron thickness. The coating was then cured by placing in a 260° C oven for a time required to reach the peak metal temperature of (PMT) quoted in the following examples.

a. A paint was made in accordance with the above, wherein the ester derivative of a polybasic acid anhydride was that of Example 1. It had a non-volatile content of 81.5% by weight at a viscosity of 5 poise. When cured at a PMT of 204° C, the film had a Knoop Hardness Number of 22 (ASTM. D1474-68) It showed good adhesion in the T bend test on aluminium sheet with a chromate conversion pretreatment, and poor adhesion in the same test on galvanized steel sheet with a zinc phosphate conversion pretreatment.

b. A paint was made in accordance with the above wherein the derivative of a polybasic acid anhydride was 40:60 blend of that of Example 1 and that of Example 5. It had a non-volatile content of 83.5% by weight at a viscosity of 5 poise. When cured at PMT 240° C, the film had a Knoop Hardness Number of 18. It showed very good adhesion in the T bend test on pretreated aluminium and very good adhesion in the same test on pretreated galvanized steel.

c. A commercially available acrylic based paint for coil coating use was applied as above and subjected to the same tests. The paint had a non-volatile content of 56.1% by weight at a viscosity of 5 poise. When cured at a PMT of 232° C, the film had a Knoop Hardness Number of 10.3. It showed very good adhesion to pretreated aluminium in the T bend test and good adhesion to pretreated galvanised steel in the same test.

d. A commercially available polyester based paint for coil coating use was applied as above and subjected to the same tests. The paint had a non-volatile content of 69.5% by weight at 5 poise. When cured at PMT 232° C, the film had a Knoop Hardness Number of 23. It showed poor adhesion to pretreated aluminium in the T bend test and very poor adhesion to pretreated galvanized steel in the same test.

Adhesion to pretreatment, unprimed metal of paints made using ester derivatives of polybasic acid anhydride of the invention was much superior to that of a commercially available polyester coil coating formulation, and comparable to a commercial acrylic coating. Additionally, paints using components according to the invention had the advantage of a significantly higher non-volatile content at application viscosity than the commercial acrylic coating, thus reducing the risk of atmospheric pollution produced by the coating process.

We claim:

1. A liquid paint composition which has a viscosity of less than 10 poise at 25° C and at a non-volatile content of at least 80% by weight and which comprises a hydroxy-group containing derivative of a polybasic acid anhydride selected from trimellitic anhydride and pyromellitic anhydride together with a cross-linking agent suitable for curing the said derivative by reaction with hydroxy groups in said derivatives, said derivative containing carboxyl groups in addition to hydroxy groups and comprising two monoesters per derivative molecule of diols selected from ethylene glycol, propylene glycol, butane diol and hexane diol and di-hydroxy esters of said diols with dicarboxylic acids, the derivative being further characterised in that it has an acid value of 40 mgm KOH per gm minimum and comprises two hydroxyl groups, which are the sole hydroxyl groups in the molecule, depending from separate carbon atoms which constitute part of a chain of not more than 40 covalently linked carbon and oxygen atoms, the said separate carbon atoms being located at opposite ends of and not more than three atoms from the extremities of the chain.

2. A liquid paint composition according to claim 1 in which the anhydride derivative and cross-linking agent are present in a weight proportion corresponding to the stoichiometric balance between the hydroxyl groups of the anhydride derivative and the available ether groups of the cross-linking agent.

3. A liquid paint composition according to claim 1 in which the cross-linking agent is methoxy melamine containing 4–6 methylol groups per molecule which groups are substantially fully etherified with methanol or ethanol.

* * * * *